Patented May 11, 1954

2,678,256

UNITED STATES PATENT OFFICE 2,678,256

DISPERSIBLE DYESTUFF POWDERS

Donald Edward Marnon, Glen Rock, N. J., assignor to General Aniline & Film Corporation, New York, N. Y., a corporation of Delaware No Drawing. Application October 30, 1951, Serial No. 253,959

6 Claims. (Cl. 8—40)

This invention relates to improved dyestuff powders, and to a method for preparing the same. More particularly, the invention relates to dyestuff powders containing water-insoluble dyestuffs, the said powders being readily dispersible in water to yield a colloidal dispersion of the dyestuff which is stable at all temperatures employed during use of the dispersion for dyeing or otherwise coloring textile materials.

This application is a continuation-in-part of my previous copending application Serial No. 781,481 of October 22, 1947, now abandoned.

Various proposals have been made heretofore to incorporate finely divided water-insoluble dyestuffs in compositions containing a wide variety of dispersing agents, protective colloids, wetting agents and the like to form dye pastes or powders which yield colloidal suspensions of the dyestuff upon addition to water. Dispersible dyestuff powders of this type are especially valuable for preparing dye baths and other compositions for coloring organic derivatives (esters or ethers) of cellulose.

While some of the processes and compositions heretofore proposed yield aqueous dispersions in which practically all of the dyestuff is colloidally dispersed, and which do not deposit the dyestuff on standing, certain dyestuffs for cellulose ester and ether fiber resist preparation of stable dispersions, and such dispersions, when obtained at room temperature, are in general not stable at elevated temperatures ordinarily encountered during their application for coloring textiles. Thus, it has been found that the dyestuffs tend to separate in more-or-less tarry form on heating the dispersions, often resulting in serious defects in materials dyed therewith. Such separation of dyestuffs from dispersions can be readily observed by boiling the dispersion for a short time, and then pouring it through a filter cloth, whereby any tarry material separated remains on the cloth in visible form.

It is an object of this invention to provide dry powdered compositions containing water-insoluble dyestuffs, especially dyestuffs suitable for coloring cellulose acetate and other organic derivatives or cellulose, but which offer special difficulty in obtaining dispersions satisfactory for dyeing the aforesaid materials, which powders yield a colloidal dispersion of the dyestuffs when added to water or an aqueous solution which is not only stable at room temperature, but also stable against deposition of insoluble tarry material on heating even at boiling temperature.

It is also an object of this invention to provide a process for preparing dry powdered dyestuff compositions having the aforesaid advantageous properties.

I have discovered that the foregoing objects are attained by reducing a dispersion-resistant dyestuff for cellulose ester and ether fiber to substantially colloidal form by mechanical comminution in the presence of a suitable quantity of aqueous secondary licorice extract, particularly by milling a mixture of the dyestuff with the secondary licorice extract in the presence of an amount of water yielding a stiff paste such that the milling operation subjects the dyestuff particles to powerful shearing action; and converting the resulting mixture to a dry powder, for example, by heating to remove the water during or after the milling operation.

The kneading applied to the mass during the milling operation distributes the ingredients of the mass uniformly therein, and the shearing action reduces the dyestuff particles or agglomerates to a colloidally dispersible state of subdivision in which the dyestuff particles are coated with the secondary licorice extract. The dried product finally obtained is a powder in which the dyestuff particles are agglutinated or agglomerated with the dried secondary licorice extract.

I have found that the resulting powders are readily dispersible in water or aqueous solutions to yield colloidal dispersions of the dyestuff wherein practically all of the dyestuff is maintained in suspension even at boiling temperature. In tests carried out under comparative conditions, wherein a variety of commercial protective colloids and dispersing agents other than the secondary licorice extract were used, powders were obtained yielding aqueous dispersions at relatively low temperatures, but upon heating, for example, to boiling temperature for ten minutes, substantial amounts of tarry material separated from the dispersions.

By secondary licorice extract is meant the extract obtained by chemical digestion (usually caustic alkali digestion but also obtainable by methods analogous to the sulfate or sulfite processes for reducing wood to paper pulp), of spent licorice root from which primary licorice extract, consisting of the water-soluble ingredients thereof, has been removed. The secondary licorice extract differs widely in chemical composition from the primary licorice extract, which is made up largely of sugars, starches, glycyrrhizin, and other water-soluble materials; whereas the secondary licorice extract employed in accordance with this invention contains mainly alkali metal salts of normally water-insoluble ingredients of resinous nature. Secondary licorice extract is available commercially in the form of a dry solid which is soluble in water to form more-or-less colloidal solutions.

The amount of secondary licorice extract employed in the compositions of this invention is at least 1 part, and preferably 4 parts for each 8 parts of water-insoluble dyestuff. Amounts up to three times the amount of dyestuff can be used but preferably not more than 1.5 parts of the secondary licorice extract is incorporated per part of dyestuff.

The amount of water employed, as indicated above, is an amount sufficient to yield a stiff paste with the other ingredients, and accordingly varies depending upon the nature and proportions of said ingredients. In general, the amount of water used can vary from 1 to 40 parts by weight and more particularly from 5 to 20 parts, for each 40 parts of insoluble dyestuff. In the preferred procedure for making the compositions of my invention, hereinafter described, water is evaporated during milling of the composition, so that an excess of water if initially present is removed, and the proper proportion required to yield a sufficiently stiff paste is attained in the course of the processing. Other ingredients, for example, diluents such as water-soluble inorganic salts, and materials facilitating dispersion in water such as wetting agents and the like can also be incorporated in the compositions of this invention. Auxiliary surface-active materials such as wetting agents, if used, are ordinarily employed in smaller amounts than the amount of secondary licorice extract.

The preferred process for making the powdered dyestuff compositions of the invention involves mixing the insoluble dyestuff in finely divided form with the desired quantity of secondary licorice extract and any other solid ingredients, sufficient water being added to form a stiff paste, in a powerful mixer wherein the paste is subjected to kneading action, which not only effects uniform distribution of the ingredients in the mass, but in addition, reduces the dyestuff particles to substantially colloidal dimensions as a result of powerful shearing forces applied thereto. At the same time, the contents of the mill are heated to evaporate the water, and milling is continued until the mass is reduced to a dry powder. If desired, evaporation of the water can be deferred until the desired degree of comminution is first attained during the milling operation. The powder is advantageously screened after removal from the mill, and is then ready for use in preparing baths, pastes or powders for use in the coloration of textile materials.

Among water-insoluble dyestuffs for textiles made of organic derivatives of cellulose (especially cellulose esters and ethers such as cellulose acetate or ethyl cellulose) which are resistant to preparation of aqueous dispersions of adequate stability for dyeing when prepared in the form of water-dispersible powders by procedures heretofore known, 1,4 - dihydroxy - 5,8 - di - (2'-hydroxy-ethylamino)-anthraquinone and α-cyano-β-(p-diethylamino-phenyl) acrylic acid ethyl ester present special difficulties in this respect, such that dispersions thereof satisfactory for dyeing could not be obtained from powders containing them made by prior processes. We have found, however, that these dyestuffs when prepared in dispersible powder form by the process of this invention yield aqueous dispersions stable not only at room temperature but at dyebath temperatures up to the boiling point of water, and adapted to produce strong uniform colorations on textile fabrics of organic derivatives of cellulose.

The preparation of compositions in accordance with the invention is illustrated by the following examples, wherein the parts are by weight.

Example 1

8 parts of finely divided 1,4-dihydroxy-5,8-(2'-hydroxyethylamino)-anthraquinone, a dyestuff suitable for coloring organic derivatives of cellulose such as cellulose acetate, and 12 parts of secondary licorice extract were charged to a Werner-Pfleiderer mixed with 15 parts of water to form a stiff mass, and milled to reduce the dyestuff to substantially colloidal form, while heating with steam circulated through the mixer jacket to evaporate the water and to reduce the mass to a dry powder. Milling was continued for about one-half hour after substantially all of the water had been removed, whereupon the resulting dry powder was discharged from the mill and screened through a 100-mesh sieve. The powdered product thus obtained was found to be readily dispersible in water, forming a stable colloidal dispersion having no tendency to separate tarry material upon boiling. The dispersion obtained is suitable for coloring organic derivatives of cellulose such as cellulose acetate fiber in brilliant blue green shades.

Example 2

10 parts of α-cyano-β-(p-diethylamino-phenyl) acrylic acid ethyl ester, 10 parts of secondary licorice extract and 15 parts of water were milled together in the form of a stiff mass in the same manner as in Example 1. The powder obtained was likewise readily dispersible in water, forming a stable colloidal dispersion having no tendency to separate tarry material on boiling. The dispersion obtained is suitable for coloring organic derivatives of cellulose in uniform brilliant yellow shades.

Comparative tests were made in connection with the composition of Example 2 by substituting for the secondary licorice extract employed therein, corresponding amounts of a partly desulfonated sodium lignosulfonate ("Marasperse CB"), a quaternary ammonium inner salt ("Leucotrope O"), and a cresol formaldehyde condensate ("Dispersing Agent SS"). In each case, dispersions obtained upon adding the resulting dyestuff powders to water were found to be relatively unstable when boiled for ten minutes, in that substantial amounts of tarry material separated therefrom, as distinguished from the stable dispersion obtained with the composition prepared with secondary licorice extract as set out above.

As indicated above, other ingredients such as water-soluble inorganic salts, and organic wetting agents can also be incorporated in the compositions of this invention. Such materials are, for example, sodium sulfate, used as an inorganic diluent, and sulfonated napthalene formaldehyde resin serving as a wetting agent. In each case, such ingredients are processed together with the dyestuff and secondary licorice extract in a Werner-Pfleiderer mixer in the same manner as set out in the preceding examples.

Other dyestuffs which are relatively resistant to the production of satisfactory dispersions for dyeing cellulose ester or ether fiber when prepared in powder form by previously known procedures are 1,4 - di - monomethylamino-anthraquinone and 4 - methyl - 2 - hydroxy-4'-acetylamino-azobenzene.

A composition containing 10 parts of 1,4-di-monomethyl-amino-anthraquinone with 6 parts of secondary licorice extract, 4 parts of sulfonated naphthalene formaldehyde resin and 15 parts of water, processed as described in the examples, yielded a powder which formed fully stable aqueous dispersions suitable for dyeing cellulose acetate in uniform shades. In comparative tests, employing the same dyestuff similar amounts of a number of dispersing agents were substituted for the secondary licorice extract employed in the aforesaid composition. These dispersing agents were sodium lignosulfonate ("Daxad 23"), sodium salts of alkaryl sulfonic acids ("Daxad 11" and "23" and "Tamol NNO"), a neutral salt of a complex condensed organic acetate ("Tamol P"), a non-ionic fatty acid condensate ("Neutronyx"). In each case, the resulting powders yielded aqueous dispersions which were inferior to those produced with the composition containing secondary licorice extract in that a tarry material separated upon heating for 10 minutes at boiling temperature.

A powder similarly prepared in accordance with the invention, from 10 parts of 4-methyl-2-hydroxy-4'-acetylamino-azobenzene, 10 parts of secondary licorice extract, 2.5 parts of sodium sulfate and 15 parts of water, likewise yielded fully stable satisfactory aqueous dispersions when added to water; while in similar comparative tests, carried out with the aforesaid azo dyestuff employing instead of the secondary licorice extract, corresponding amounts of a sodium lignosulfonate ("Daxad 23"), a sodium salt of an alkaryl sulfonic acid ("Daxad 11"), and a partly desulfonated sodium lignosulfonate ("Marasperse CB"), the resulting compositions were inferior to the powder containing secondary licorice extract in that aqueous dispersions prepared therewith separated tar upon heating at boiling temperature for 10 minutes.

Variations can be made in the preparation of the dispersible dyestuff compositions set out in the foregoing examples, without departing from the scope of the invention. The proportions of the ingredients can be varied within the limits set out above. The kneading operation can be carried out in any equipment sufficiently powerful to subject the stiff dye paste to strong shearing action so as to reduce the dyesutff particles to colloidal dimensions, and to distribute the ingredients uniformly in the mixture. Excess water, if present initially during the mixing operation, can be evaporated during the kneading to form a stiff paste of the required consistency. If desired, the initial mixing operation can be carried out without evaporation of water until the dyestuff is sufficiently comminuted, and the water can be removed in a second stage of the mixing process.

An important advantage of the kneading process employed in accordance with this invention lies in the fact that the entire processing operation from the starting materials to the dry dyestuff powder can be carried out in a single apparatus such as a Werner-Pfleiderer mixer.

Variations and modifications which will be obvious to those skilled in the art can be made in the process of this invention without departing from the scope or nature thereof.

I claim:

1. A dry water-dispersible dyestuff powder containing a water-insoluble dyestuff suitable for the coloration of organic derivatives of cellulose, of the class consisting of 1,4-dihydroxy-5,8-di-(2'-hydroxyethylamino) - anthraquinone and $\alpha$-cyano-$\beta$-(p-diethylamino-phenyl) - acrylic acid ethyl ester in the form of colloidally dispersible particles agglutinated with dried secondary licorice extract.

2. A dry water-dispersible powder as defined in claim 1, in which the secondary licorice extract amounts to at least 1 part by weight for each 8 parts of said dyestuff.

3. A dry water-dispersible powder as defined in claim 1, in which the secondary licorice extract amounts to ½ to 1½ parts per part by weight of said dyestuff.

4. A process for preparing a water-dispersible dye powder containing a water-insoluble dyestuff for the coloration of organic derivatives of cellulose, of the class consisting of 1,4-dihydroxy-5,8-di-(2'-hydroxyethylamino) - anthraquinone and $\alpha$-cyano-$\beta$-(p-diethylamino-phenyl)-acrylic acid ethyl ester, which powder yields aqueous dispersions stable to heating at boiling temperature, which comprises kneading a mass containing said dyestuff in finely divided form together with secondary licorice extract, and water in an amount yielding a stiff kneadable mass with the other ingredients of the mixture, until the dyestuff particles are reduced to colloidally dispersible form, drying the mixture and comminuting to a powder.

5. A process as defined in claim 4, wherein the amount of secondary licorice extract is at least 1 part by weight for each 8 parts by weight of the said dyestuff.

6. A process as defined in claim 4, wherein the amount of secondary licorice extract is from ½ to 1½ parts per part by weight of said dyestuff.

References Cited in the file of this patent

UNITED STATES PATENTS

| Number | Name | Date |
| --- | --- | --- |
| Re. 21,402 | Crossley | Mar. 19, 1940 |
| 1,828,592 | Bommer | Oct. 20, 1931 |
| 1,843,313 | Baumann | Feb. 2, 1932 |
| 1,898,953 | Grossman | Feb. 21, 1933 |
| 2,158,899 | Gideon | May 16, 1939 |
| 2,181,800 | Crossley | Nov. 28, 1939 |